United States Patent [19]
Mellon

[11] Patent Number: 5,662,017
[45] Date of Patent: Sep. 2, 1997

[54] SCROLL SAW

[76] Inventor: Ernesto Claude Mellon, 11700 Lock La., New Kent, Va. 23124

[21] Appl. No.: 671,610

[22] Filed: Jun. 28, 1996

Related U.S. Application Data

[63] Continuation-in-part of Ser. No. 314,319, Sep. 28, 1994, abandoned.

[51] Int. Cl.⁶ .............................. B26D 7/18; B27B 19/10
[52] U.S. Cl. .................. 83/169; 83/171; 83/520; 83/783; 83/816
[58] Field of Search .................. 83/98, 168, 816, 83/783, 784, 785, 169, 522.11, 520, 530, 76, 171

[56] References Cited

U.S. PATENT DOCUMENTS

| | | | |
|---|---|---|---|
| 1,820,294 | 8/1931 | Anderson | 83/785 |
| 2,107,174 | 2/1938 | Boice | 83/98 |
| 2,488,947 | 11/1949 | Vavrik | 83/520 |
| 2,599,430 | 6/1952 | Beuerman | 83/76 |
| 2,810,410 | 10/1957 | Alsina | 83/785 |
| 3,195,385 | 7/1965 | Paterson | 83/76 |
| 3,334,795 | 8/1967 | Cockrell | 83/76 |
| 4,311,074 | 1/1982 | Titus | 83/816 |
| 4,356,750 | 11/1982 | Legler et al. | 83/816 |
| 4,503,742 | 3/1985 | Sutton | 83/783 |
| 4,807,361 | 2/1989 | Raczkowski | 83/169 |
| 4,833,782 | 5/1989 | Smith | 83/520 |
| 5,038,481 | 8/1991 | Smith | 83/520 |
| 5,361,660 | 11/1994 | Tsubota | 83/169 |

*Primary Examiner*—Rinaldi I. Rada
*Assistant Examiner*—Sean A. Pryor

[57] ABSTRACT

A scroll saw for cutting complex contours in a work piece with minimal vibration. The inventive device includes a substantially U-shaped main body having horizontally extending legs between which a saw blade is reciprocally mounted. A cogged belt extends over a plurality of guide pulleys and terminates at opposed ends of the saw blade. A drive pulley is oscillated by an electric motor and engages the belt to effect reciprocation of the saw blade. An air pump is also mechanically powered by the drive pulley for removing dust particles from the work area. Also included is a vibration reduction system and further a saw lubrication system.

5 Claims, 6 Drawing Sheets

SCROLL SAW

BACKGROUND OF THE INVENTION

1. Field of the Invention

The present invention is a continuation-in-part of the parent application which was filed Sep. 28, 1994 under Ser. No. 08/314,319, now abandoned and relates to saws and more particularly pertains to a scroll saw for cutting complex contours in a work piece with minimal vibration.

2. Description of the Prior Art

The use of saws is known in the prior art. More specifically, saws heretofore devised and utilized for the purpose of reciprocating a saw blade are known to consist basically of familiar, expected and obvious structural configurations, notwithstanding the myriad of designs encompassed by the crowded prior art which have been developed for the fulfillment of countless objectives and requirements.

For example, a scroll saw is illustrated in U.S. Pat. No. 5,058,476 in which the ends of a saw blade are prepositioned between a pair of blade holders, with the blade holders being mounted to the free ends of a pair of pivotally mounted, spaced arm members, such that oscillation of the arm members effects reciprocation of the saw blade.

Another patent of interest is U.S. Pat. No. 5,018,420 which teaches a machine tool comprising a frame with fixing elements for fastening a scroll saw blade. The fixing elements are driven by an electrical motor in a vertical reciprocating movement. The two fixing elements are linked to each other by a metallic ribbon passing on pulleys. The position of the pulley can be changed by means of a cam acting on an arm so as to stretch the ribbon to the desired value.

While these devices fulfill their respective, particular objectives and requirements, the aforementioned patents do not disclose a scroll saw which includes vibration reduction means and saw lubrication means.

In these respects, the scroll saw according to the present invention substantially departs from the conventional concepts and designs of the prior art, and in so doing provides an apparatus primarily developed for the purpose of cutting complex contours in a work piece.

SUMMARY OF THE INVENTION

In view of the foregoing disadvantages inherent in the known types of saws now present in the prior art, the present invention provides a new scroll saw construction wherein the same can be utilized for cutting complex contours in a work piece. As such, the general purpose of the present invention, which will be described subsequently in greater detail, is to provide a new scroll saw apparatus and method which has many of the advantages of the saws mentioned heretofore and many novel features that result in a scroll saw which is not anticipated, rendered obvious, suggested, or even implied by any of the prior art saws, either alone or in any combination thereof.

To attain this, the present invention includes a substantially U-shaped main body having an upper leg and a lower leg, with said legs of said main body extending in a substantially horizontal orientation; a saw blade; an upper blade chuck slidably mounted to said upper leg of said main body, said upper blade chuck being operable to receive and secure an upper portion of said saw blade; a lower blade chuck slidably mounted to said lower leg of said main body, said lower blade chuck being operable to receive and secure a lower portion of said saw blade such that said blade is reciprocally mounted between said legs of said main body; a plurality of guide pulleys rotatably mounted within said main body; a belt having first and second ends, said belt being coupled at said first end thereof to said upper blade chuck and to said lower blade chuck at said second end thereof, said belt extends over said plurality of rotatably mounted guide pulleys; and oscillating means with a fixed first stroke for effecting oscillation of said belt over said guide pulleys at a fixed second stroke at about twice the first stroke, thereby resulting in an oscillation of said blade chucks and said associated blade to effect cutting of a work piece.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scroll saw which has all the advantages of the prior art scroll saws and none of the disadvantages.

It is another object of the present invention to provide a new and improved scroll saw which may be easily and efficiently manufactured and marketed.

It is a further object of the present invention to provide a new and improved scroll saw which is of a durable and reliable construction.

An even further object of the present invention is to provide a new and improved scroll saw which is susceptible to a low cost of manufacture with regard to both materials and labor, and which accordingly is then susceptible to low prices of sale to the consuming public, thereby making such scroll saw economically available to the buying public.

Still yet another object of the present invention is to provide a new and improved scroll saw which provides in the apparatuses and methods of the prior art some of the advantages thereof, while simultaneously overcoming some of the disadvantages normally associated therewith.

It is a further object of the present invention to provide a lubrication means for reducing friction associated with the reciprocation of a blade of a saw.

Still another object of the present invention is to provide a new scroll saw for cutting complex contour in a work piece.

Yet another object of the present invention is to provide a scroll saw which is comprised of a plurality of parts which, in combination, afford a scroll saw with minimum vibration.

Another object of the present invention is to utilize a motor-driven drive pulley designed to drive both an air pump and a saw with the stroke of the air pump being half that of the saw.

Yet another object of the present invention is to utilize a motor-driven drive pulley for damping vibration resulting from the horizontal component of the reciprocation thereof.

An even further object of the present invention is to provide a new and improved scroll saw which employs ceramic bearings and a KEVLAR™ belt.

Still yet another object of the present invention is to provide a scroll saw which is operable to effect the cutting of complex contours along a work piece by utilizing a pair of blade chucks which permit an associated blade to move within a true vertical plane so as to appear as a black line when reciprocated.

Lastly, it is an object of the present invention to provide a new and improved scroll saw for cutting complex contours in a work piece with minimal vibration. The inventive device includes a substantially U-shaped main body having horizontally extending legs between which a saw blade is reciprocally mounted. A cogged belt extends over a plurality of guide pulleys and terminates at opposed ends of the saw blade. A drive pulley is oscillated by an electric motor and engages the belt to effect reciprocation of the saw blade. An air pump is also mechanically powered by the drive pulley for removing dust particles from the work area. Also included is vibration reduction means and further lubrication means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

With reference now to the drawings, and in particular to FIGS. 1–9 thereof, a new scroll saw embodying the principles and concepts of the present invention and generally designated by the reference numeral 10 will be described.

Figure 1:
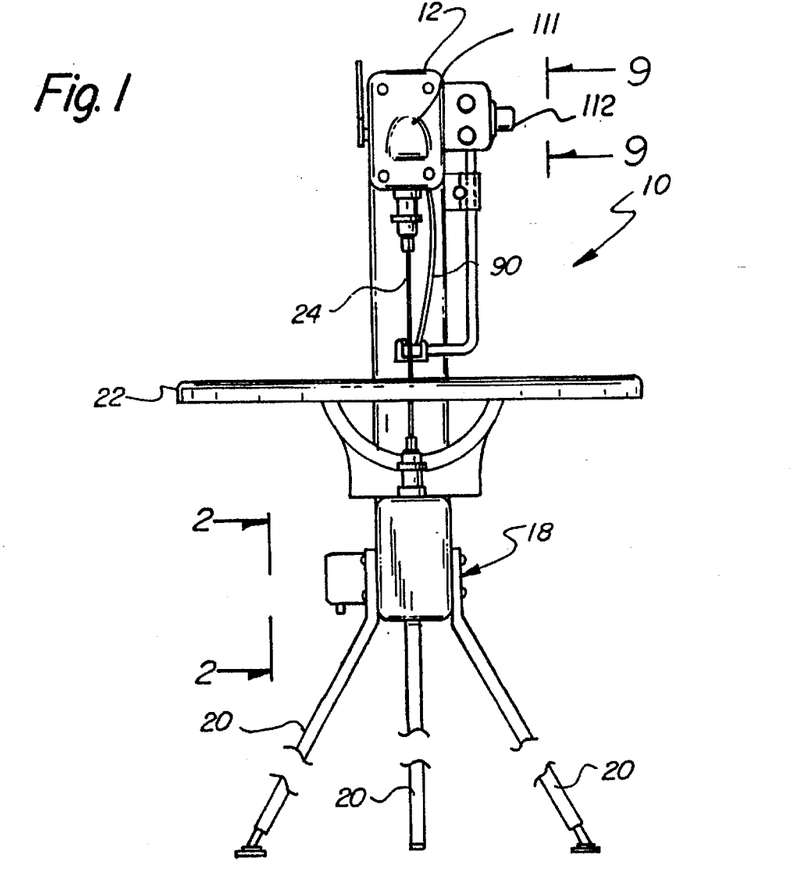
FIG. 1 is a front elevation view of a scroll saw comprising the present invention.

More specifically, it will be noted that the scroll saw 10 comprises a substantially U-shaped main body 12 having an upper leg 14 and a lower leg 16, with the legs of the main body extending in a substantially horizontal orientation. The main body 12 is supported relative to a ground surface by a support stand 18 which comprises a plurality of legs 20 extending from the lower leg 16 of the main body 12. A table top 22 is adjustably mounted to the lower leg 16 of the main body 12 so as to be positioned between the upper leg 14 and the lower leg. The table top 22 is operable to receive thereon a work piece which may be slidably moved thereover during a cutting procedure.

Figure 3:
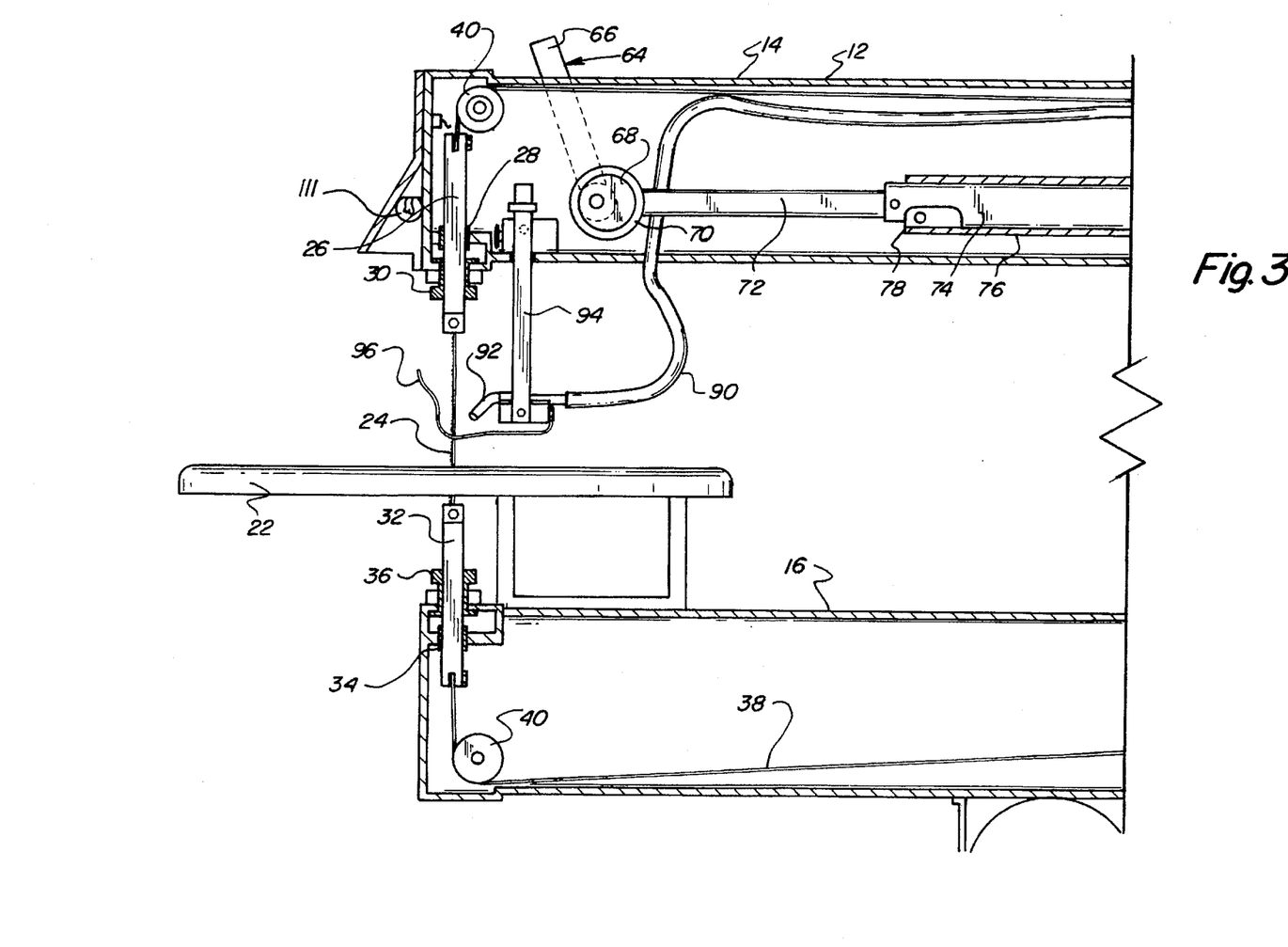
FIG. 3 is a cross sectional view illustrating components within an interior of the main body.

As best illustrated in FIG. 3, a saw blade 24 is reciprocally mounted between the upper and lower legs 14, 16 of the U-shaped main body 12. To this end, an upper blade chuck 26 is slidably mounted by both an upper support bearing 28 and an upper sealing bearing 30 to the upper leg 14 of the main body 12. The upper blade chuck 26 is operable to receive and secure the upper portion of the saw blade 24. The blade may or may not include pins on opposite thereof. Similarly, a lower blade chuck 32 is slidably mounted to the lower leg 16 of the main body 12 by both a lower support bearing 34 and a lower sealing bearing 36 through which the lower blade chuck extends. By this structure, the blade 24 is reciprocally mounted between the legs 14, 16 of the main body 12 so as to extend through an aperture in the table top 22.

Figure 2:
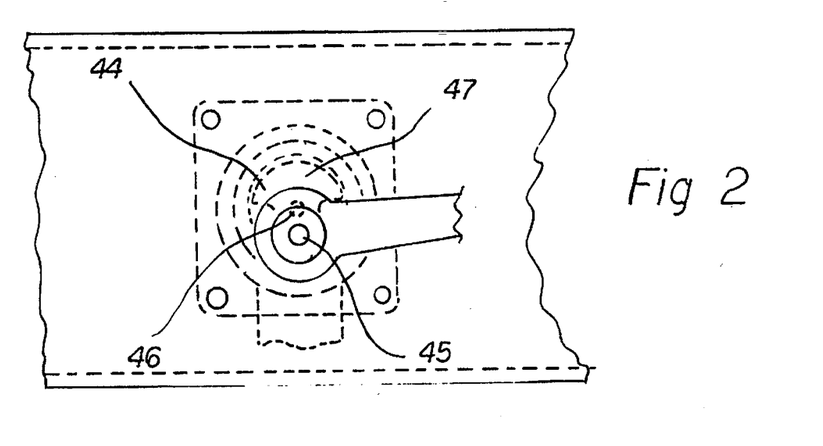
FIG. 2 is a side elevation view as seen from line 2—2 of FIG. 1.
Figure 4:
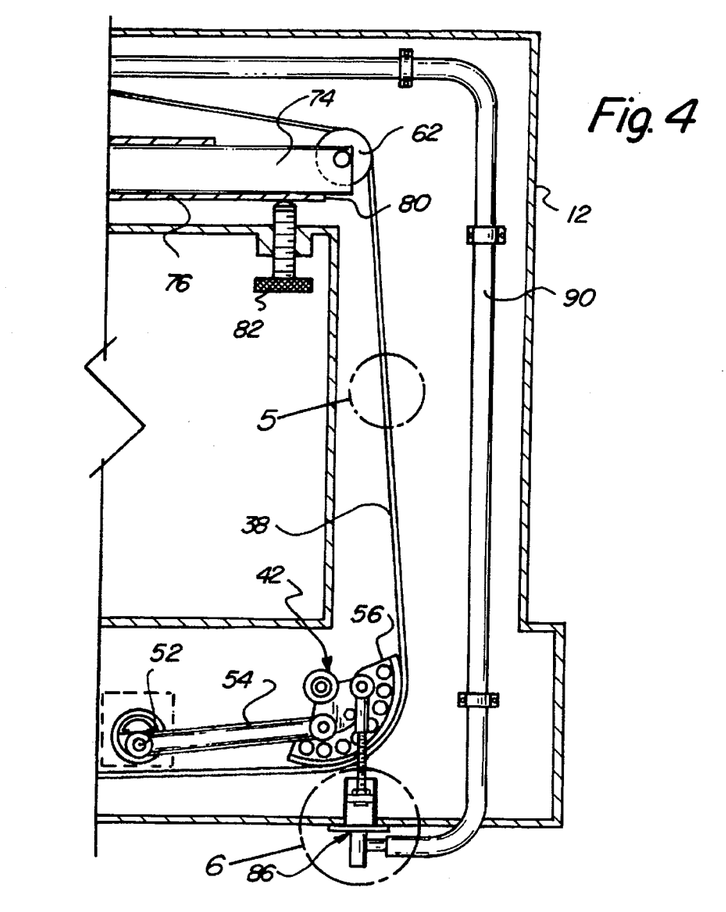
FIG. 4 is a continuation of the cross section illustration of FIG. 3.
Figure 5:
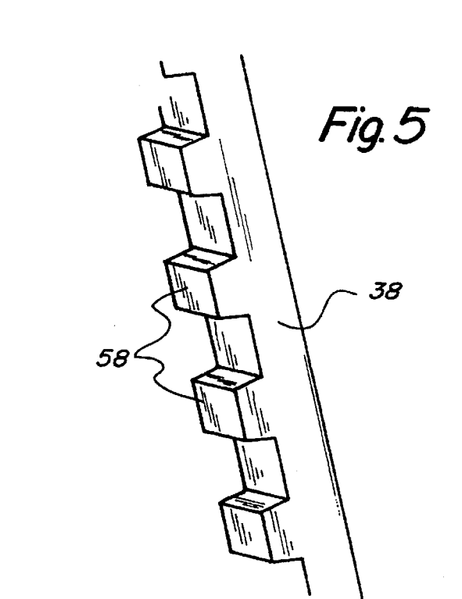
FIG. 5 is an enlarged isometric illustration of the area set forth in FIG. 4.
Figure 6:
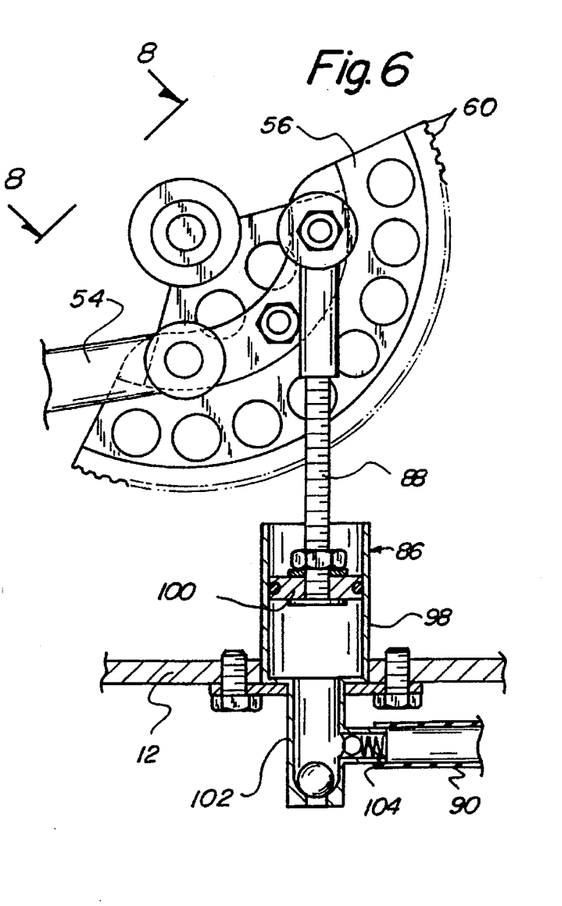
FIG. 6 is a cross section illustration of a portion of the present invention including the area set forth in FIG. 4.

To effect reciprocation of the blade chucks 26, 32 and the associated blade 24, a belt 38 having first and second ends thereof is coupled to the upper blade chuck at the first end thereof and to the lower blade chuck at the second end thereof. The belt 38 extends over a plurality of rotatably mounted guide pulleys 40 within the main body 12. Each pulley has a reduced diameter and is constructed from a light-weight aluminum alloy. As best illustrated in FIG. 4, the belt 38 also extends over a belt oscillating means 42 operable to effect oscillation of the belt over the guide pulleys 40, thereby resulting in oscillation of the blade chucks 26, 32 and the associated blade 24 to effect cutting of a work piece. The belt oscillating means 42, as illustrated in FIG. 2, initially comprises an electric motor mounted to the main body which mechanically communicates with a crank 52. The crank is mounted within the main body and includes a cam 44. The cam 44 is centrally coupled to a rotor 45 of the motor and includes a first portion 46 with a fixed first weight and a second portion 47 formed diametrically opposite the first portion. The second portion of the cam has with a fixed second weight greater than the first weight. Thus, energizing the electric motor 44 causes the cam of the crank 52 to rotate through the mechanical communication of the crank. With continuing reference to FIG. 4, it can be shown that the first portion of the cam rotatably and eccentrically mounts a connecting rod 54 such that rotation of the cam of the crank imparts a reciprocating motion to the connecting rod. It should be noted that a vibration associated with the reciprocation of the cam and connecting rod is attenuated by the second portion of the cam. To transfer the reciprocating motion of the connecting rod 54 to the belt 38, a drive pulley 56 is pivotally mounted within the housing 12. The connecting rod 54 is pivotally and eccentrically mounted to the drive pulley 56 such that reciprocation of the connecting rod 54 causes an oscillating pivoting motion of the drive pulley 56 which may be imparted to the belt 38. To this end, and as best illustrated in FIG. 5, the belt 38 includes a plurality of cogs 58, with the belt extending over the drive pulley 56 such that the cogs 58 positively engage a plurality of teeth 60 formed along an engaging surface of the drive pulley, as shown in FIG. 6. Ideally, the connecting rod and the drive pulley are constructed from a light-weight aluminum alloy. Also, the drive pulley contains a plurality of holes formed therein for reducing the weight thereof. It should be noted that such reduction of weight significantly reduces the vibration of the present invention since it is the horizontal component of the reciprocation of the connecting rod and drive pulley which are significant contributors to such vibration.

As best illustrated in FIGS. 3 and 4, the scroll saw 10 further comprises an adjustment pulley 62 over which the belt 38 extends, with the adjustment pulley being selectively movable to effect tensioning of the belt. To this end, the adjustment pulley 62 is rotatably mounted to a tension release assembly 64. The tension release assembly 64 includes a rotatable lever 66 which is rotatably mounted exteriorly of the upper leg 14 of the main body 12 and extends into the upper leg and terminates in an eccentric cam 68 which may be selectively rotated through a manual actuation of the lever. The eccentric cam 68 is positioned within a cam receiver 70 such that actuation of the lever 66 and subsequent rotation of the eccentric cam 68 will effect a longitudinal movement of a push rod 72 which is fixedly secured to the cam receiver. The push rod 72 is pivotally coupled to a telescoping member 74, with the telescoping member being slidably received within a support tube 76. The support tube 76 is pivotally mounted at a first end 78 thereof, as illustrated in FIG. 3, and supported at a second end 80 thereof by a fine adjustment screw 82 which extends through a portion of the upper leg 14 of the main body 12. The telescoping member 74 extends through the support tube 76 and exits through a second end 80 thereof, whereat the adjustment pulley 62 is rotatably mounted. By this structure, the lever 66 may be manually rotated to effect withdrawal of the telescoping member 74 from the first end 78 of the support tube 76, thereby releasing any tension imparted to the belt 38 by the adjustment pulley 62. Further, when the lever 66 is positioned in the locked or tensioned orientation as illustrated in FIG. 3, the fine adjustment screw 82 may be utilized to effect infinitely variable tensioning adjustment to the belt 38. Preferably, the belt 38 is comprised of a low-stretch "KEVLAR"™ material which exhibits very little elasticity or resiliency. As such, deflection of the blade 24 is minimized, thereby providing a more accurate cut of the work piece.

Figure 7:
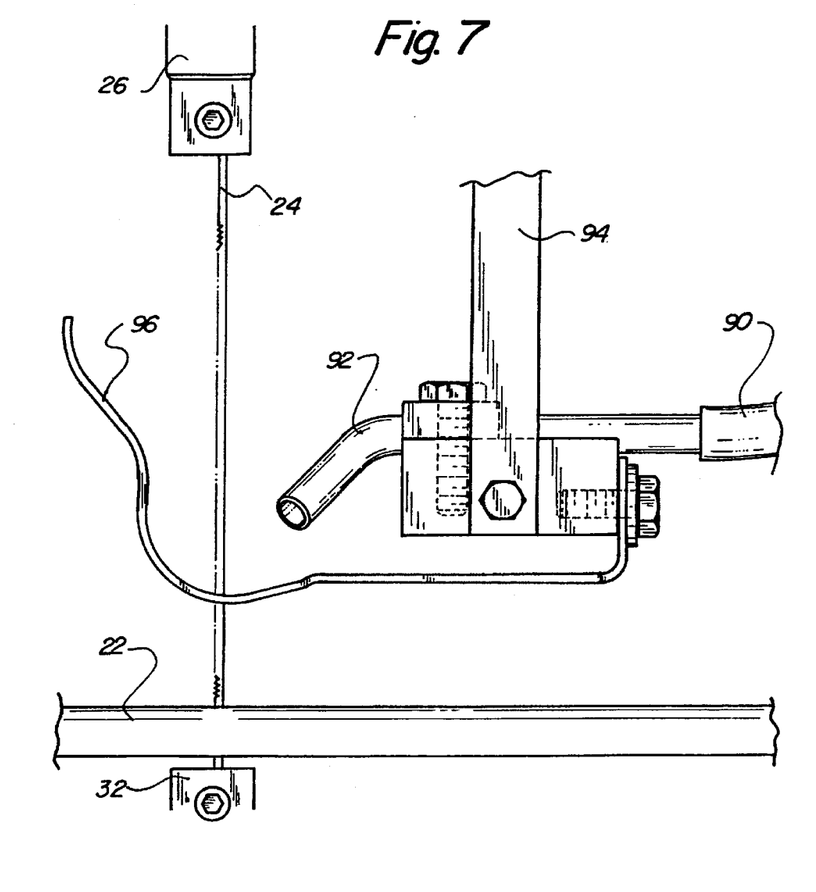
FIG. 7 is a further side elevation view of a portion of the present invention.

Referring now to FIGS. 4 and 6, it can be shown that an air pump means 86 is mechanically coupled to the drive pulley 56 by a piston rod 88. The air pump means 86 is operable to pump air through an air supply tube 90 which extends through the substantially U-shaped main body 12 and terminates in a nozzle 92 supported by an adjustably mounted depending stanchion 94, as best illustrated in FIG. 3. The depending stanchion 94 is slidably mounted to the upper leg 14 of the main body 12, whereby an unlabelled adjustment button may be selectively operated to effect vertical adjustment of the stanchion as will be described later. The nozzle 92 is mounted to a lower distal end of the stanchion 94 and fluidly communicates with the air supply tube 90 so as to deliver pressurized air generated by the air pump means 86 proximal to the blade 24, thereby removing any debris or the like which are generated during a cutting procedure. Further, as illustrated in FIG. 7, a work guide 96 is also mounted to a lower distal end of the depending stanchion 94.

Figure 11:
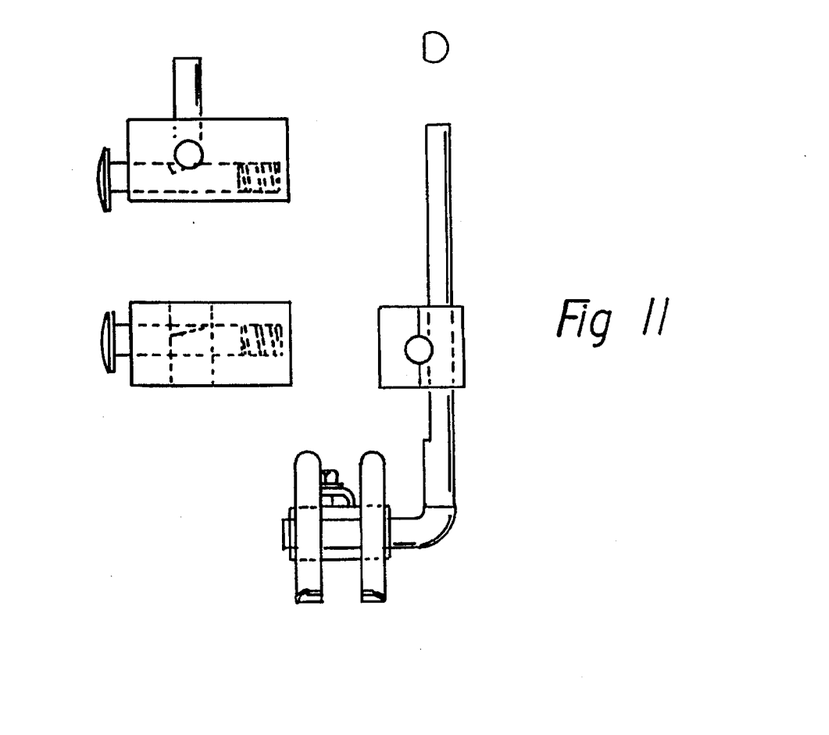
FIG. 11 is a mechanism for affording convenient adjustment of the stanchion which supports the nozzle shown in FIG. 3.

Vertical adjustment of the nozzle is effected via the slidable coupling of the stanchion with the upper leg of the main body. As shown in FIG. 11, the unlabelled adjustment button has a shaft integrally formed therewith which is horizontally situated within a horizontally oriented aperture formed in a casing. Such casing is fixed to the upper leg of the housing. The casing further has a vertically oriented aperture for allowing the stanchion to be slidably positioned therein. The shaft preferably has a groove formed therein and an associated spring for forcing the groove to abut the stanchion thereby precluding vertical movement thereof. Upon the depression of the adjustment button and coincident biasing of the spring, the groove of the shaft is moved distant the stanchion thus allowing the stanchion to be vertically adjusted. Ideally, the stancion has a flat surface formed along its entire length for providing maximum contact with the groove of the shaft.

To generate such pressurized fluid flow, the air pump means comprises a hollow cylinder 98 mounted to a portion of the main body 12 proximal to the drive pulley 56, as illustrated in FIGS. 4 and 6. A piston 100 is mounted to the piston rod 88 such that reciprocal motion of the piston rod 88 imparted thereto by the reciprocal motion of the drive pulley 56 to which it is pivotally coupled will reciprocate the piston within the cylinder 98. A gravity biased check valve 102 is in fluid communication with the cylinder 98 and permits entrance of ambient air into the cylinder during an upward stroke of the piston 100. A spring biased check valve 104 is also in fluid communication with the cylinder 98 and the air tube 90 to permit air within the cylinder to be biased under pressure through the air tube during a downward movement of the piston 100. Due to the unique coupling of the drive pulley and the air pump means, the friction between the piston and the cylinder damps the horizontal component of the reciprocation of the drive pulley and connecting rod thus further contributing to the reduction of vibration.

Figures 8, 9:
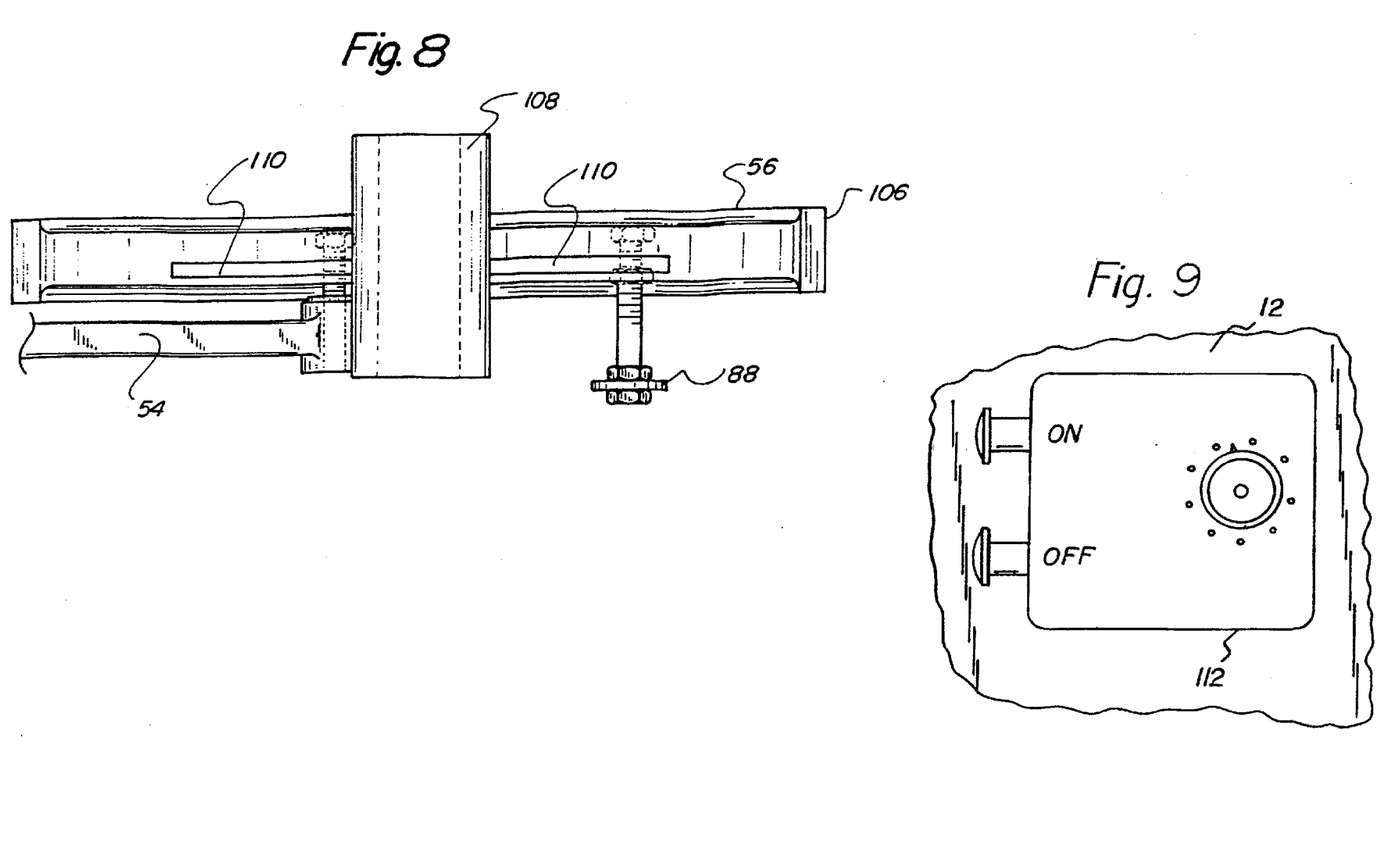
FIG. 8 is a plan view of a drive pulley of the present invention as viewed from line 8—8 of FIG. 6.
FIG. 9 is an isometric illustration of a control means as viewed from line 9—9 of FIG. 1

FIG. 8 illustrates a plan view of the drive pulley 56 and it can be seen from this Figure that the drive pulley includes a belt engaging face 106 from which the teeth 60 project. The drive pulley 56 further comprises a pulley mount 108 permitting rotatable mounting of the drive pulley, with a connecting wed 110 extending between the pulley mount 108 and the belt engaging face 106.

Further included is a light 111 coupled to the upper leg of the main body. Such light faces downwardly for illuminating the blade and lower leg upon the actuation thereof. Ideally, the light 111 comprises a halogen bulb for maximum light emission.

FIG. 9 illustrates a control means 112 mounted on the upper leg of the main body in an accessible location. The control means includes a switch adapted to selectively energize the electric motor upon the depression thereof. A dial is included for selecting the rate of reciprocation of the blade. Yet another switch is included for deactivating the motor.

Figure 10:
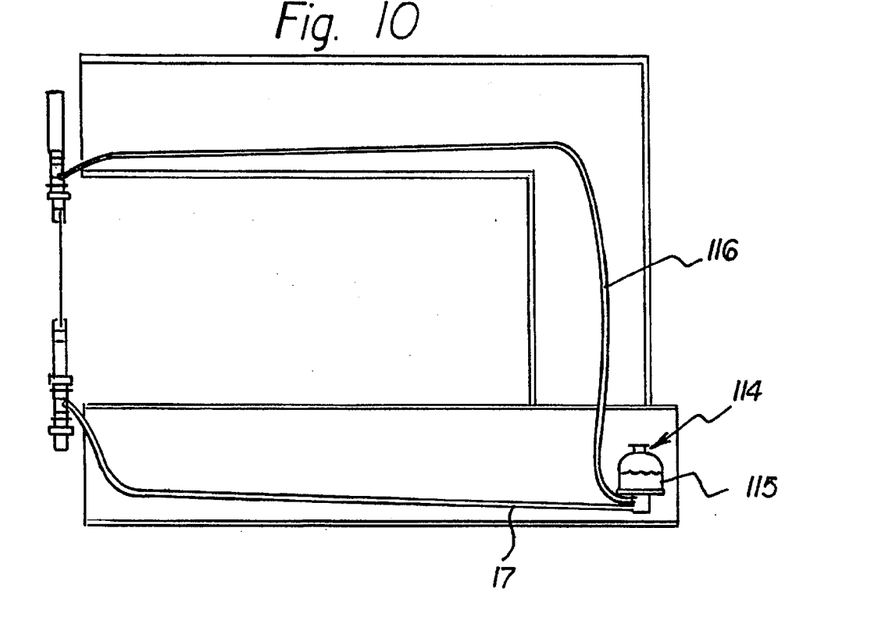
FIG. 10 is a cross section illustration of a portion of the present invention depicting an associated lubrication system.

The last component of the present invention is a lubrication system 114. As best shown in FIG. 10, the lubrication system includes a refillable reservoir 115 situated at the lower leg for containing a predetermined amount of lubricating fluid. A first conduit 116 has a first end coupled to a lower portion of the reservoir and a second end coupled to the upper blade chuck for providing lubrication thereto. Further included is a second conduit 117 having a first end coupled to a lower portion of the reservoir and a second end coupled to the lower blade chuck for providing lubrication thereto. As such, the bearings of the blade chucks works in conjunction with the fluid in order to reduce friction induced work required by the motor and further attenuate heat generation.

As can be seen in the Figures, the oscillating drive pulley 56 is driven by the connecting rod 54 with a first fixed stroke. This movement effects an oscillating of the belt over its guide pulleys and teeth 60 with a fixed second stroke which is about twice the length of the first stroke. This occurs because the distance between the axis of rotation of the drive pulley and its teeth 60 is about twice the distance between said axis of rotation and the point where the connecting rod 54 couples drive pulley 56. Ideally, the length of the second stroke is approximately 1 and ½ inches. Such length is longer than standard blade strokes. The length of the second stroke thus utilizes a greater portion of the blade which affords improved heat distribution and extended longevity of the blade.

In addition, the movement of the oscillating drive pulley 56 reciprocates piston rod 88 with a fixed third stroke to generate a pressurized air flow. The distance between the axis of rotation of the drive pulley 56 and the point of connection of the piston rod 88 to the drive pulley is essentially the same as the distance between said axis of rotation and the point where the connecting rod 54 couples to drive pulley 56. Consequently, the piston rod 88 has a stroke essentially equal to the stroke of the connecting rod 54, about half that of the belt 38 and blade 24. As such, the air pump is conveniently driven by the drive pulley and further the magnitude of the air flow thereof is determined by the length of the third stroke which is designed to afford a reasonable amount.

In use, the scroll saw 10 according to the present invention is operable to effect the cutting of complex contours along a work piece, because the blade chucks 26, 32 permit the blade 24 to move within a true vertical plane, the blade, when oscillated, appears as a black line. Further, because of the substantially inelastic construction of the belt 38, deflection of the blade 24 as a result of stretching of the belt is substantially reduced.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scroll saw comprising:

a substantially U-shaped main body having an upper leg and a lower leg, with said legs of said main body extending in a substantially horizontal orientation;

a saw blade;

an upper blade chuck slidably mounted to said upper leg of said main body, said upper blade chuck being operable to receive and secure an upper portion of said saw blade;

a lower blade chuck slidably mounted to said lower leg of said main body, said lower blade chuck being operable to receive and secure a lower portion of said saw blade such that said blade is reciprocally mounted between said legs of said main body;

a plurality of guide pulleys rotatably mounted within said main body;

a belt having first and second ends, said belt being coupled at said first end thereof to said upper blade chuck and to said lower blade chuck at said second end thereof, said belt extends over said plurality of rotatably mounted guide pulleys; and oscillating means with a fixed first stroke for effecting oscillation of said belt over said guide pulleys at a fixed second stroke at about twice the first stroke, thereby resulting in an oscillation of said blade chucks and said associated blade to effect cutting of a work piece;

said oscillating means comprises a drive pulley rotatably mounted within said main body, said drive pulley being engaged to said belt, and an electric motor in mechanical communication with said drive pulley to effect oscillation of said drive pulley;

a crank rotatably mounted within said main body including a cam centrally coupled to a rotor of the motor, the crank further comprising a connecting rod rotatably coupled to the first portion of the cam such that said connecting rod is reciprocated during rotation of said rotor, said connecting rod being eccentrically and pivotally mounted to said drive pulley; and an air tube terminating in a nozzle, said nozzle being therefore adjustably supported between said legs of said main body proximal to said saw blade, and an air pump means for pumping air through said air tube;

wherein said air pump means comprises a hollow cylinder mounted to a portion of said main body proximal to said drive pulley, a piston rod pivotally mounted to said drive pulley and extending into said cylinder, a piston movably positioned within said cylinder and mounted to said piston rod, a first check valve in fluid communication with said cylinder for permitting entrance of ambient air into said cylinder during a first stroke of said piston, and a second check valve in fluid communication with both said cylinder and said air tube for permitting air within said cylinder to be biased under pressure through said air tube during a second stroke of said piston;

wherein the drive pulley reciprocates the piston rod with a fixed third stroke, with a distance between an axis of rotation of the drive pulley and a point of connection of the piston rod to the drive pulley essentially the same as the distance between said axis of rotation and the point where the connecting rod couples to drive pulley thereby defining the length of the third stroke to be equal in length to the first stroke and half that of the second stroke;

a lubrication system including at least one refillable reservoir means for containing a predetermined amount of lubricating fluid, a first conduit means having a first end coupled to the at least one reservoir and a second end in communication with the upper blade chuck for providing lubrication thereto and further a second conduit means having a first end coupled to the at least one reservoir means and a second end in communication with the lower blade chuck for providing lubrication thereto.

2. A scroll saw comprising:

a substantially U-shaped main body having an upper leg and a lower leg, with said legs of said main body extending in a substantially horizontal orientation;

a saw blade;

an upper blade chuck slidably mounted to said upper leg of said main body, said upper blade chuck being operable to receive and secure an upper portion of said saw blade;

a lower blade chuck slidably mounted to said lower leg of said main body, said lower blade chuck being operable to receive and secure a lower portion of said saw blade such that said blade is reciprocally mounted between said legs of said main body;

a plurality of guide pulleys rotatably mounted within said main body;

a belt having first and second ends, said belt being coupled at said first end thereof to said upper blade chuck and to said lower blade chuck at said second end thereof, said belt extends over said plurality of rotatably mounted guide pulleys; and oscillating means with a fixed first stroke for effecting oscillation of said belt over said guide pulleys at a fixed second stroke at about twice the first stroke, thereby resulting in an oscillation of said blade chucks and said associated blade to effect cutting of a work piece;

said oscillating means comprises a drive pulley rotatably mounted within said main body, said drive pulley being engaged to said belt, and an electric motor in mechanical communication with said drive pulley to effect oscillation of said drive pulley;

a crank rotatably mounted within said main body including a cam centrally coupled to a rotor of the motor, the cam having a first portion with a fixed first weight and a second portion formed diametrically opposite the first portion with a fixed second weight greater than the first weight, the crank further comprising a connecting rod rotatably coupled to the first portion of the cam such that said connecting rod is reciprocated during rotation of said rotor and a vibration associated therewith is attenuated by the second portion of the cam, said connecting rod being eccentrically and pivotally mounted to said drive pulley; and a lubrication system including at least one refillable reservoir means for containing a predetermined amount of lubricating fluid, a first conduit means having a first end coupled to the at least one reservoir and a second end in communication with the upper blade chuck for providing lubrication thereto and further a second conduit means having a first end coupled to the at least one reservoir means and a second end in communication with the lower blade chuck for providing lubrication thereto.

3. The scroll saw as recited in claim 2, and further including control means having a switch for selectively energizing the electric motor, a dial for selecting the rate of reciprocation of the blade, and another switch for deactivating the motor, the control means mounted to an exterior portion of the upper leg of the main body.

4. The scroll saw as recited in claim 3, and further comprising a light coupled to the upper leg and face downwardly for illuminating the blade and lower leg upon the actuation thereof.

5. A scroll saw comprising:

a substantially U-shaped main body having an upper leg and a lower leg, with said legs of said main body extending in a substantially horizontal orientation, wherein the main body is supported by a support stand comprising a plurality of legs extending from the lower leg of the main body and a table top adjustably mounted to the lower leg of the main body so as to be positioned between the upper leg and lower leg thereby being operable to receive thereon a work piece which may be slidably moved thereover during a cutting procedure;

a saw blade reciprocally mounted between the upper and lower legs of the U-shaped body;

an upper blade chuck slidably mounted to said upper leg of said main body, said upper blade chuck being operable to receive and secure an upper portion of said saw blade;

a lower blade chuck slidably mounted to said lower leg of said main body, said lower blade chuck being operable to receive and secure a lower portion of said saw blade such that said blade is reciprocally mounted between said legs of said main body thus extending through an aperture formed in the table top;

a plurality of guide pulleys rotatably mounted within said main body;

a belt having first and second ends, said belt being coupled at said first end thereof to said upper blade chuck and to said lower blade chuck at said second end thereof, said belt extends over said plurality of rotatably mounted guide pulleys;

oscillating means with a fixed first stroke for effecting oscillation of said belt over said guide pulleys at a fixed second stroke at about twice the first stroke, thereby resulting in an oscillation of said blade chucks and said associated blade to effect cutting of a work piece, wherein said oscillating means comprises a drive pulley rotatably mounted within said main body, said drive pulley having a plurality of teeth being engaged to a plurality of cogs formed on said belt, and an electric motor in mechanical communication;

a crank mounted within said main body including a cam centrally coupled to a rotor of the motor, the cam having a first portion with a fixed first weight and a second portion formed diametrically opposite the first portion with a fixed second weight greater than the first weight, the crank further comprising a connecting rod rotatably coupled to the first portion of the cam such that said connecting rod is reciprocated during rotation of said rotor and a vibration associated therewith is attenuated by the second portion of the cam, said connecting rod also being eccentrically and pivotally mounted to said drive pulley;

a tension release assembly means for selectively releasing tension on said belt and facilitating variable tension adjustment, wherein said tension release assembly means comprises a rotatable lever rotatably mounted exteriorly of said upper leg of said main body and extending into said upper leg wherein said rotatable lever terminates in an eccentric cam which may be selectively rotated through a manual actuation of said lever, a cam receiver receiving said eccentric cam, a push rod coupled to said cam receiver such that rotation of said lever resulting in a subsequent rotation of said eccentric cam will effect a longitudinal movement of said push rod, a support tube pivotally mounted within said main body and supported by a fine adjustment screw threadably engaged to a portion of said main body, a telescoping member slidably received within said support tube, said telescoping member extending through said support tube to support an adjustment pulley at a distal end of said telescoping member, with said adjustment pulley being engaged to said belt such that movement of said adjustment pulley effects tensioning of said belt, wherein the support tube is further supported by a fine adjustment screw which extends through the upper leg of the main body to effect infinitely variable tensioning adjustment of the belt;

an air tube terminating in a nozzle, said nozzle being adjustably supported between said legs of said main body proximal to said saw blade with a stanchion, and an air pump means for pumping air through said air tube, wherein said air pump means comprises a hollow cylinder mounted to a portion of said main body proximal to said drive pulley, a piston rod pivotally mounted to said drive pulley thus reciprocating the piston rod with a fixed third stroke, a piston movably positioned within said cylinder and mounted to said piston rod, a first check valve in fluid communication with said cylinder for permitting entrance of ambient air into said cylinder during a first stroke of said piston, and a second check valve in fluid communication with both said cylinder and said air tube for permitting air within said cylinder to be biased under pressure through said air tube during a second stroke of said piston, wherein a distance between an axis of rotation of the drive pulley and the point of connection of the piston rod to the drive pulley is essentially the same as the distance between said axis of rotation and a point where the connecting rod couples to drive pulley thereby defining the length of the third stroke to be equal in length to the first stroke and half that of the second stroke;

a light coupled to the upper leg and face downwardly for illuminating the blade and lower leg upon the actuation thereof;

a lubrication system including a refillable reservoir situated at the lower leg for containing a predetermined amount of lubricating fluid, a first conduit having a first end coupled to a lower portion of the reservoir and a second end coupled to the upper blade chuck for providing lubrication thereto and further a second conduit having a first end coupled to a lower portion of the reservoir and a second end coupled to the lower blade chuck for providing lubrication thereto; and a control means including a switch for selectively energizing the electric motor, a dial for selecting the rate of reciprocation of the blade, and another switch for deactivating the motor, the control means mounted to an exterior portion of the upper leg of the main body.

* * * * *